April 6, 1948.  W. H. KORFF  2,439,048
TAILLESS AIRPLANE
Filed Oct. 5, 1942  4 Sheets-Sheet 2
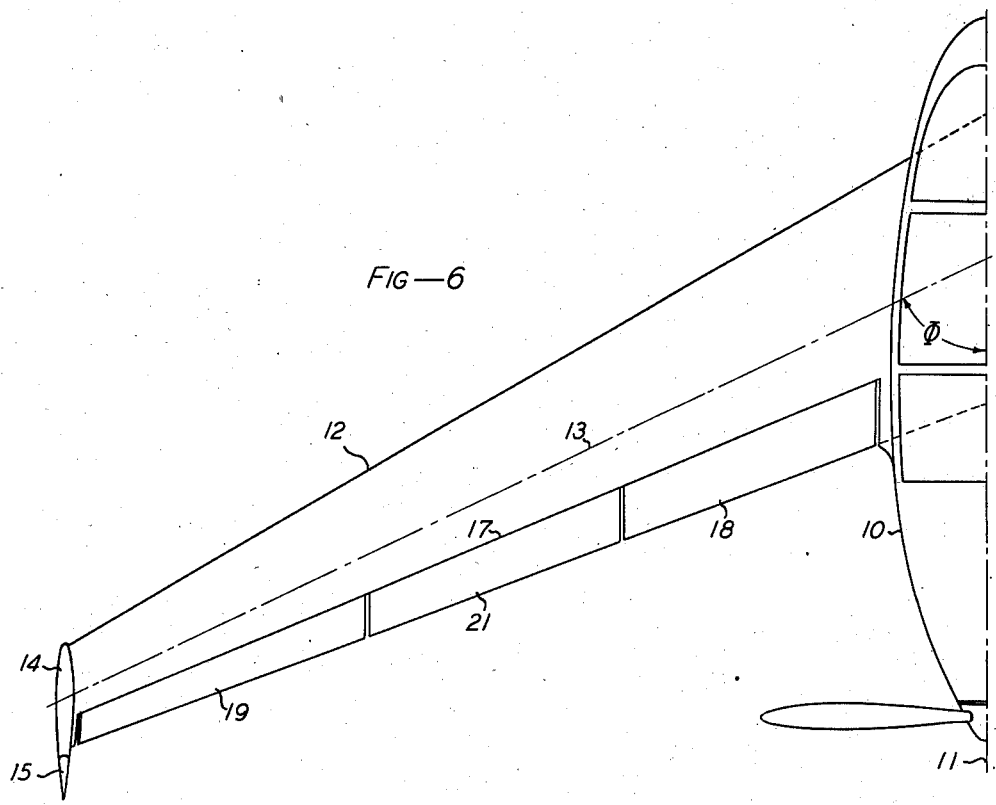
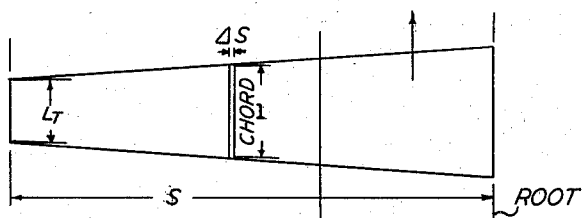
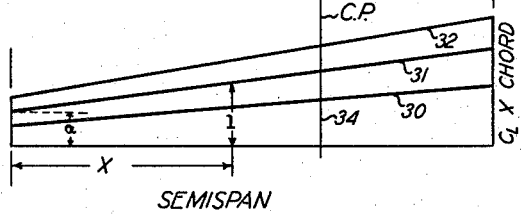
INVENTOR
WALTER H. KORFF
BY George C. Sullivan

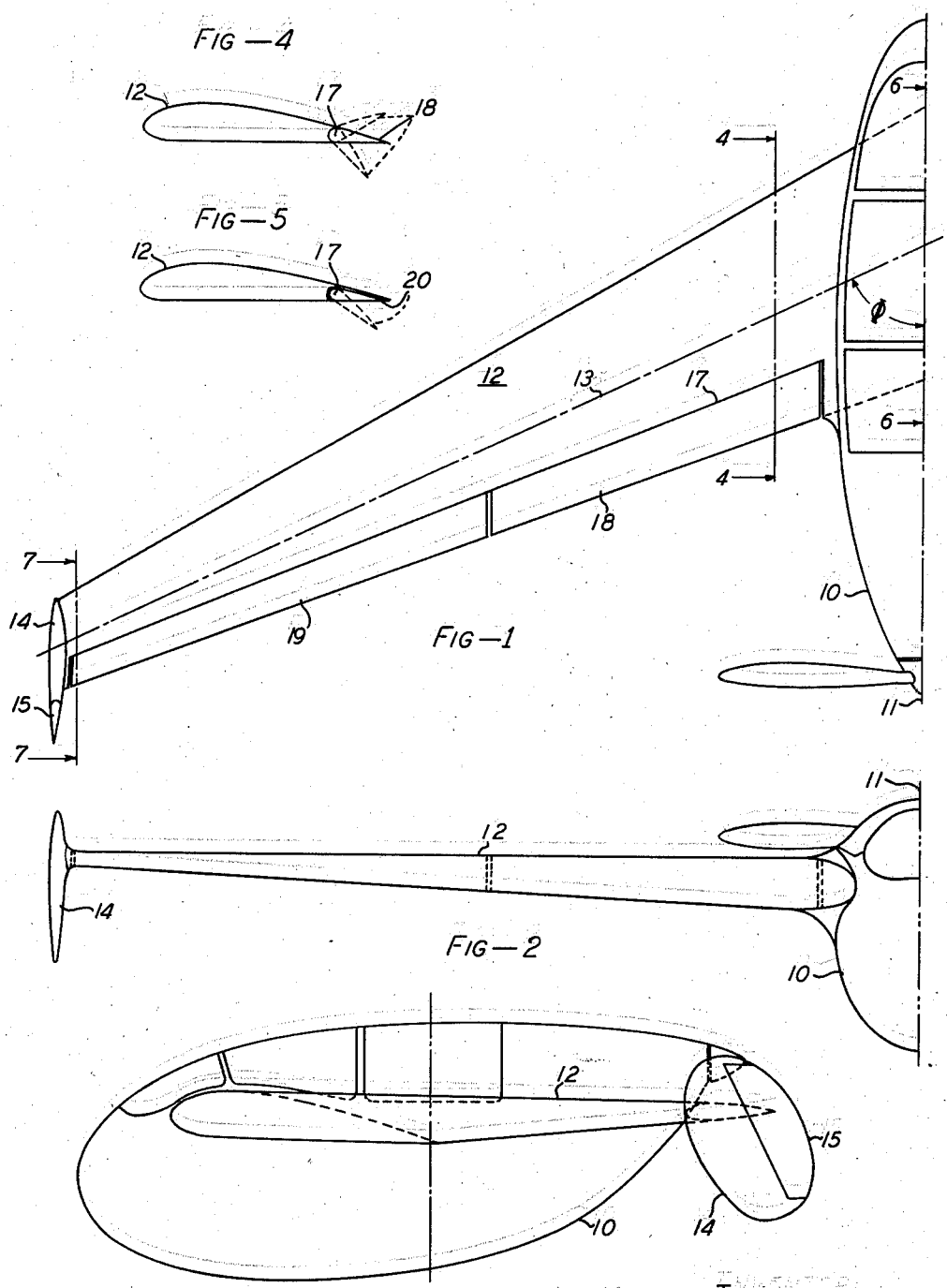

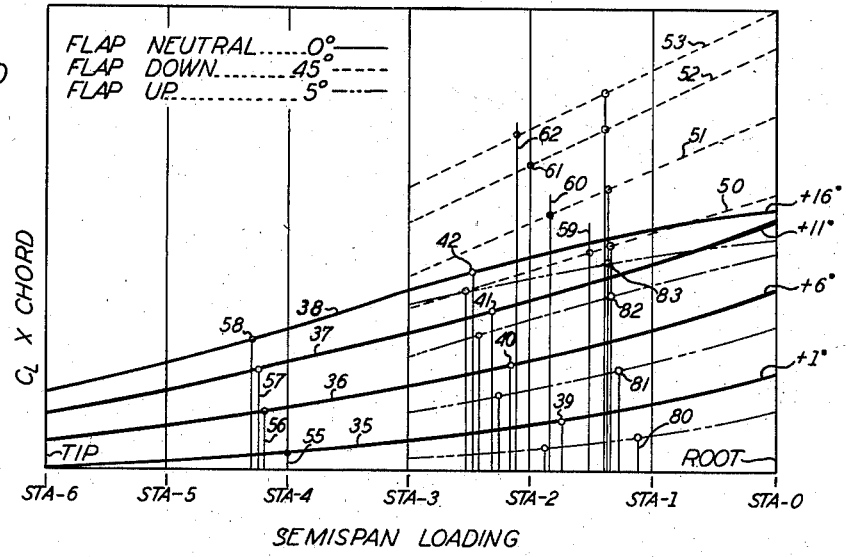
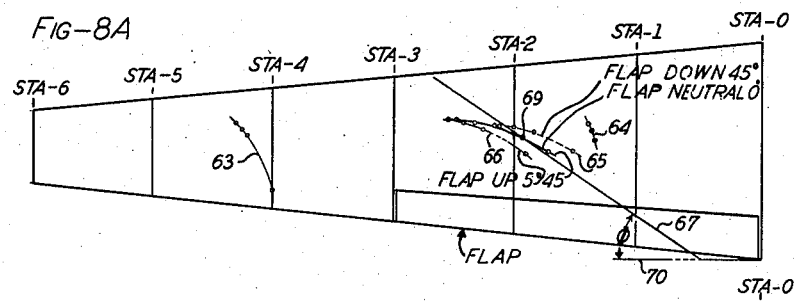
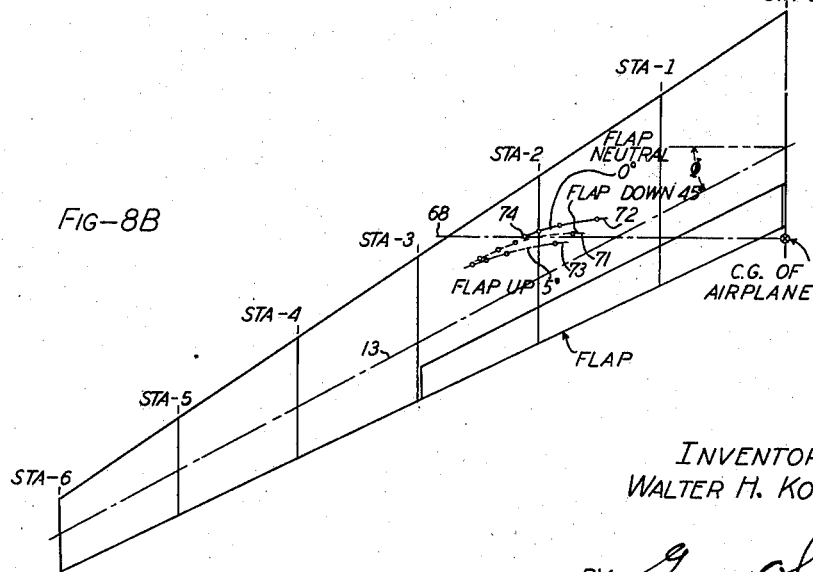

INVENTOR
WALTER H. KORFF
BY George C. Sullivan

Patented Apr. 6, 1948

2,439,048

UNITED STATES PATENT OFFICE 2,439,048

TAILLESS AIRPLANE

Walter H. Korff, Burbank, Calif., assignor to Lockheed Aircraft Corporation, Burbank, Calif.

Application October 5, 1942, Serial No. 460,797

4 Claims. (Cl. 244—13)

This invention relates to improvements in the so-called tailless airplane of the type having a single main supporting airfoil and without the conventional horizontal stabilizer airfoil usually employed in a position either to the rear of or in front of the main airfoil.

In the ordinary airplane of conventional design employing a rearwardly positioned horizontal stabilizer maintenance of stability and control require that a downward load be carried upon the stabilizer particularly under conditions of high angles of attack such as at take-offs and landing, and this down load in addition to the gross weight of the airplane must necessarily be borne by the lift of the main wing. Consequently, in this type of airplane, for a given load carrying capacity either the landing or take-off speeds or the main wing area or both must be increased to provide the added lift equal to the horizontal stabilizer down load and in either case additional power consumption is required for a given pay load. The rearwardly located horizontal stabilizer arrangement also has the disadvantage of increasing the total structural weight, the aerodynamic drag and the cost of construction of the airplane as a whole.

In the so-called forward tail type of airplane in which the horizontal stabilizer is located forward of the main wing, an upward load is normally carried on the stabilizer assisting the main wing in supporting the airplane, particularly at high angle of attack conditions. Consequently, in this forwardly located horizontal stabilizer type of airplane, lower landing and take-off speeds for a given load or given total wing area are possible and moreover, under all conditions less power is required for flight as compared to the conventional airplane hereinbefore mentioned. The forwardly located horizontal stabilizer, however, as in the case of the rearwardly located stabilizer, still has the disadvantage of added aerodynamic drag, structural weight and complication and cost of construction.

In the so-called tailless type of airplane as heretofore constructed, the disadvantages of drag, weight and cost associated with the forward or rearward horizontal stabilizer arrangement have been largely eliminated with the omission of the separate stabilizer surfaces, but stability of the airplane and control under high angle of attack conditions with this arrangement has heretofore been accomplished largely by employing sweep-back in the wings and providing means to maintain a down load on the trailing wing tips which act in the same manner and serves the same purpose as the down load on the conventional rearwardly located stabilizer of the conventional airplane as hereinbefore described. Under such conditions the effective coefficient of lift of the wing as a whole is low, particularly at high angles of attack. For this and other reasons the tailless type of airplane, to date, has shown few, if any, advantages over aircraft of good conventional design. However, this tailless design, which virtually embodies main wing and rearwardly located stabilizer in one single wing of continuous and increased span, has the advantage over both the forward and rearward tail types of construction in resulting in an overall reduction in the effective induced and profile drag and weight for a given total airfoil area.

Objects of the present invention are to overcome and eliminate the hereinbefore mentioned aerodynamic and structural disadvantages inherent in the three types of airplanes hereinbefore described and to take advantage of and combine in a single airplane of simplified construction all of the advantages inherent in both the forward tail and tailless types of airplane construction.

The objects of this invention are realized in an embodiment of this invention in which the desirable features of both the forward stabilizer type and so-called tailless type of airplanes are combined and the disadvantages associated with these two types of airplanes are largely eliminated, resulting in a tailless airplane having the characteristics and advantages of a forward stabilizer type of airplane in regard to efficiency of use of the entire airfoil surfaces for producing useful lift under all conditions and attitudes of the airplane and having the aerodynamic and structural advantage associated with utilizing a single sustaining airfoil of increased aspect ratio and the elimination of a separate stabilizer.

The invention broadly stated resides in a single longitudinally stable airfoil, the entire surface of which normally and under such conditions of stability, carries a positive lift.

The invention more specifically stated resides in a single longitudinally stable airfoil carrying sweep-back and aerodynamic or geometrical twist or wash-out in the laterally extending portions thereof of such degree and so combined as to result in a forward travel of the center of pressure with decreasing angles of attack and a rearward travel of the center of pressure with increasing angles of attack for all normal flight conditions while at the same time maintaining positive lift on all portions of such airfoil.

The invention further resides in an airplane employing the before mentioned inherently stable airfoil, combining sweep-back and wash-out and additionally an elevator control flap constituting a hinged portion of the trailing edge adjacent the root section thereof, the length and position of such hinged flap being such that lowering of the flap results in simultaneous increase of the effective maximum coefficient of lift and a forward movement of the center of pressure of the airfoil as a whole resulting in a stalling moment whereby high angles of attack of the airfoil with simultaneous increase in the overall effective coefficient and maximum coefficient of lift may be attained.

The invention in its narrower aspects resides in an airplane employing the before mentioned inherently stable airfoil combining sweep-back and wash-out and additionally, elevator control trailing edge flaps adjacent the root section, ailerons adjacent the trailing airfoil tips and lift modifying flaps located intermediate the elevator flaps and ailerons whereby high angle of attack, increased maximum coefficient of lift and increased drag or braking action can be simultaneously effected.

Other objects and features of novelty will be evident hereinafter.

In the drawings in which preferred embodiments of the invention are illustrated;

Figure 1 is a semi-plan view of the airplane which is symmetrical about the center line, showing the general arrangement of the fuselage wings and control surfaces;

Figure 2 is a front elevation of the airplane, of Figure 1;

Figure 3 is a side elevation of the airplane of Figure 1;

Figure 4 is a cross-section of the wing taken at 4—4 of Figure 1;

Figure 5 is a cross-section of the wing taken at 4—4 of Figure 1 showing an optional type of flap;

Figure 6 is a plan view of the airplane similar to Figure 1 but illustrating a modified form of the invention;

Figures 7A and 7B are plan diagrams of wings equivalent to that of the present invention except without sweep-back or "wash-out" illustrating certain aspects of the derivation of the conditions for stability and control.

Figures 8A and 8B are plan diagrams of the wing illustrating the derivation of the loci of center of pressure travel and the proper degree of sweep-back.

Figure 10 is a loading diagram for the semi-span of the wing with the elevator flap at several positions.

Figure 9:
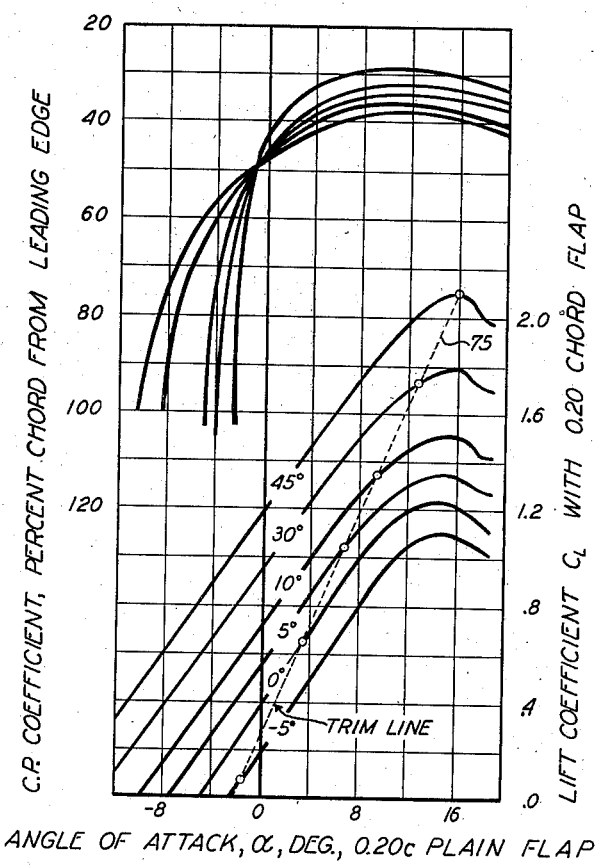
Figure 9 is a graphical representation of the lift and center of pressure characteristics of a typical airfoil section profile of the type employable in the present invention.

Referring now to the drawings throughout which the same reference characters refer to similar parts, 10 is a suitable fuselage carrying a laterally extending main wing, the semi-span portion extending to the left of line 11 of the longitudinal plane of symmetry which is shown at 12, having a sweep-back angle ($\phi$) with respect to the 50% chord center line 13. Vertical stabilizers and rudders are carried at the wing tips as shown at 14 and 15 respectively and the trailing edge of the said wing carries a pair of plain hinged or split, partial span flaps as shown at 16, each adapted to be raised or lowered through suitable angles about the hinge line 17 as best shown at 18 and 20 respectively in Figures 4 and 5.

In Figure 6, in which an optional form of the invention is illustrated, the partial span flaps 18 and ailerons 19 which are adjacent the fuselage and wing tips respectively, are made shorter than those shown in Figure 1 to provide for an additional intermediate trailing edge flap 21 also hinged about line 17 and located intermediate the beforementioned flap 18 and aileron 19. The said flaps 18 and 21 are adapted to be actuated by means of conventional controls in the pilot's compartment through suitable coupling means such as cables or push rods so that they may be raised or lowered simultaneously with corresponding flaps on the opposite wing semispan and aileron flaps 21 or each semispan wing tip may be differentially operated in the conventional manner.

The present invention is applicable to wings having substantially any desired plan form varying from rectangular to sharply tapered and those of tapered plan form may vary in chord and thickness in accordance with a curvilinear or straight line function of the span. In other words, the invention is applicable to rectangular wings or to tapered wings in which the leading and trailing edges may be either straight or curved. The airfoil section may in either case be constant throughout the wing span or it may vary from point to point along the span, usually in such a manner as to undergo a uniform transition from one given airfoil section at the root to another airfoil section at the tip and this transition of airfoil section may be employed to advantage in the present invention to achieve aerodynamic or geometrical twist or "wash-out" as hereinafter more fully described.

For the purpose of simplified illustration and description of the fundamental principles and means of attaining the objects of the present invention reference is now made mainly to Figures 7 to 11 by means of which the manner of accomplishing the present invention is illustrated, and the following approximate analysis of the aerodynamic characteristics of this wing will serve to illustrate the fundamental principles upon which the present invention is based. Reference is first made to Figures 7A and 7B in which a plan view and approximate loading diagram respectively is shown of the semispan of a typical wing of conventional tapered plan form without sweep-back or twist.

Assuming the airfoil of Figure 7A to be in flight under conditions of a given constant air speed the available lift exerted on any small increment or spanwise sectional element $\Delta s$ of the wing will be a value which is directly proportional to the product of the chord dimension $l$ by the coefficient of lift $C_{L_A}$ of that element, and the total lift for the semispan will be equal to the summation of the lift on all such increments or spanwise elements throughout the length of the wing semispan S.

If, for example, the airfoil section profile and the angle of incidence is the same throughout the length of the span S, then the coefficient of lift, $C_L$ of the wing neglecting end effects will be the same value or constant throughout the length of the span, or $C_L=K$ and in a wing of the tapered plan form shown and in which the chord length is as before described, a straight line function of the span:

$$l = l_t + ax$$

where $l$ is the chord length of any given chord elements, $\Delta s$ at a distance $x$ from the tip, $l_t$ is the chord length at the tip section and $a$, is the rate of taper. Since the lift on any given spanwise element of the wing is proportional to the coefficient of lift multiplied by the chord of that element the left distribution neglecting end effects and other minor factors will then be substantially uniform throughout the span and this type of loading may be graphically represented in the manner of Figure 7B.

The span loading is, therefore, seen to be a straight line function which has a slope which is proportional to the said variation $a$, in chord taper from wing tip to root. Now, if the angle of attack of this airfoil is varied throughout its practical range and within the substantially straight portion of the lift coefficient-angle of attack curve the corresponding $C_L$ variations will result in shifting the span loading line up or down as the angle of attack is increased or decreased as illustrated by lines 30, 31 and 32 in Figure 7B.

The resulting areas under each of these loading lines will be proportional to the total lift of the semispan of the wing and the centers of gravity of all of the areas thus included under these lines are found to fall upon the common vertical line 34 which is perpendicular to the span. From this analysis it is apparent that an airfoil where the angle of incidence is constant throughout the span and whether or not it has taper, the effective spanwise location of the center of pressure remains substantially at a constant distance from the root section and does not move spanwise as the angle of attack is varied. Since with the usual cambered airfoil section the chordwise center of pressure movement is forward with increased angles of attack and rearward with decreased angles of attack, under the beforementioned conditions the wing is manifestly unstable.

Now, if the wing is given either geometrical or aerodynamic twist or "washout" which varies, for example, as an inverse straight line function from root to tip section, the $C_L$ of the wing elements for any given angle of incidence of the wing will correspondingly vary substantially uniformly from root to tip in accordance with the equation $$C_L = C_{L_T} + bx$$

where $C_{L_T}$ is the coefficient of lift at the tip section, $b$ is a constant numerically equal to the uniform rate of "washout" along the semispan and $x$ is the distance of the spanwise element from the wing tip, but the trace of the span loading line will then be a function of the combined factors of wing taper and washout, or $$L = C_L \times l = (C_{L_T} + bx) \cdot (l_t + ax)$$

and since this is a second power exponential equation the span loading lines will under these conditions be curved and therefore as the overall angle of attack of the wing carrying "washout" is varied as by rotation on its spanwise axis, the span loading lines will no longer move up or down in the manner illustrated in Figure 7B to include areas, the loci of the centers of gravity of which fall on a vertical straight line shown at 34 but the slopes of the lines will be modified by the non-uniformity of the lift coefficient throughout the span to result in loading lines which appear curved as illustrated at 35, 36, 37 and 38 in which case the spanwise locations or centroids of the centers of gravity of the areas included under the curved loading lines no longer fall at a fixed spanwise location but fall at variable spanwise locations as indicated by the lines 39, 40, 41 and 42 in Figure 10. Now, by projecting these centroid lines to their points of intersection with their corresponding center of pressure lines as shown in Figure 8A as obtained from the data of Figure 9 the coordinates of the center of pressure for the various angles of attack may be established as shown in Figure 8A and the locus of such center of pressure travel is seen to form a curved line as shown at 45 having a negative slope with respect to the spanwise axis of the airfoil as more fully explained hereinafter.

Referring now primarily to Figures 8 to 11 and for purposes of illustrating the method of accomplishing the present invention, the following example is given. The wing is assumed to have a taper ratio of 3 to 1, a uniform twist or washout of 6° from the root plane of symmetry center line 11 to the tip (or an angle of attack differential of one degree per station) and an airfoil section profile uniform throughout the span and to have the lift coefficient and center of pressure characteristics as given in Figure 9.

The said loading curves may be constructed by dividing the semispan of the wing into any suitable number of stations such as for example by station lines Nos. 0 to 6, as shown in Figure 8A and computing the loading for each station line section of the airfoil as a value equal to the product of the $C_L$ for that station times the chord length and plotting the resultant values as corresponding ordinates for each of such stations. The values for $C_L$ for each station may be obtained from any suitable airfoil characteristic curve and in the present case, as before stated, these values were taken by way of example from the data of Figure 9 which show the relationship between angle of attack and coefficients of lift and center of pressure for a typical airfoil section approximating in profile that of the Clark Y.

First taking the values of $C_L$ from the 0° curve which indicates the characteristic of the airfoil with the flap in neutral or undeflected position and with the root section at station No. 0 assumed to be set at an angle of attack of +1°, the products of coefficient of lift and chord length for each are plotted at each station taking into account the twist in the angle of incidence throughout the span and loading curve 35 constructed through the points thus established. The same operations are repeated for any desired number of angles of attack; for example curves 35, 36, 37 and 38 are for arbitrarily chosen root angles of attack of 1°, 6°, 11° and 16° respectively. Next the respective spanwise location of the center of gravities of the areas included under the curves 35—38 are projected from centroid lines 39 to 42 onto the wing plan form of Figure 8A to the point of intersection with the corresponding chordwise centers of pressure location lines, and curve 45 constructed through such point to establish the locus of the center of pressure travel as beforementioned. The beforementioned intersecting center of pressure lines may be approximately located by plotting on Figure 8A at each station line the corresponding location of the center of pressure for the section profile and angle of attack at such station points and constructing spanwise curves through these points. These curves are found to be substantially straight lines except for the extremely low angles of attack condition.

Next the semispan loading curves 50 to 53 may be similarly constructed for the condition where the flap which extends over the innermost three station intervals of the wing is lowered to some given angle such as for example 45° and the corresponding lift values under such condition corresponding to various angles of attack at the several stations are obtained from the values of $C_L$ taken from the 45° curve of Figure 9. In this condition, since there is a marked discontinuity in the chordwise center of pressure location for the outer tip section which carries no depressed flap and the root section which carries the depressed flap, the corresponding center of pressure lines for these portions of the wing are separately established from data of Figure 9 and the spanwise locations of the centers of gravity of the corresponding portions of the loading curves as respectively indicated by lines 55 to 58 and 59 to 62 are projected to intersection therewith to establish separate loci of center of pressure travel for each quarter span portion as shown at 63 and 64 in Figure 8A. Now, by establishing the weighted resultant center of pressure points between the locus curves 63 and 64 the resultant line 65 is established which represents the locus of the center of pressure travel for the condition where the flap 18 is lowered 45°.

The locus line 66 is similarly established for the condition where the flap is raised 5°, by employing the center of gravity lines 80 to 83.

The wing of Figure 8A without sweep-back and having the thus established center of pressure loci 45, 65 and 66, is obviously unstable since it is apparent that the chordwise center of pressure travel is always in a direction tending to increase rather than decrease any angle of attack displacement which may occur.

Now, in order to attain longitudinal stability, the longitudinal center of gravity line must pass through the center of pressure locus line at an angle as shown at 67 and through the point 69 on curve 45 corresponding to the angle of incidence at which it is desirable to have the airplane in trim so that as the angle of incidence is increased above the angle of trim the center of pressure passes rearward of the line 67 to produce a counteracting couple about line 67 tending to increase the diving moment and return the airplane to the trim angle. Likewise, when the angle of incidence is reduced to a value below the trim angle, the center of pressure must move forward on curve 45 with respect to the center of gravity line 67 to produce a counteracting couple tending to increase the stalling moment and return the airplane to the trim angle. The angle $\phi$ between line 67 and the lateral axis line 70 indicates the approximate angle of sweep-back necessary to be imparted to the airfoil of Figure 8A to attain this condition. Therefore, if the elementary chord sections of the wing of Figure 8A are each moved uniformly backward in their own planes without reducing the span until a sweep-back of approximately $\phi$ degrees is attained, the longitudinal center of gravity position line 67 will be brought about to a position as shown by the rectilinear line at 68 in Figure 8B extending laterally at the same angle through the locus line. The locus line will in turn be in effect rotated to a new position as shown at 71 such that as the angle of attack of the wing is decreased the center of pressure moves inward and forward and as the angle of attack is increased the center of pressure moves outward and rearward, thus attaining a condition of automatic longitudinal stability.

The center of pressure locus line 72 intersects the center of gravity line 68 at point 74 which corresponds to a wing angle of attack of 16° with the flap deflected 45° downward. The airplane, therefore, may be trimmed at this high angle of attack by lowering the flap to 45° since under this condition the pitching moments are zero. Intermediate flap angles will effect trim at angles intermediate the maximum angle of 16° and the trim angle of approximately 2° as determined by the point of intersection 72 of the center of gravity line 68 through the locus curve 71. If the flap 18 is raised to some angle such as approximately 5° above neutral the center of pressure will fall in locus line 73 behind the center of gravity line 68 to effect an increase in the diving moment. The angle to which the flap must be raised to obtain trim at, say, 1° is approximately indicated by the ratio of the distance forward and aft of the center of gravity line 68 between the curves 73 and 71, and the approximate trim angles of attack for various flap settings can be estimated in this manner. The corresponding trim angles of attack for various flap settings may be plotted as shown at line 75 of Figure 9.

From the foregoing it is apparent that an angle of sweep-back and partial span flap combination can be attained which will allow the pitching moment to be controlled by the flap so that a stalling moment can be effected by lowering the flap and a diving moment effected by raising the flap.

Figure 11:
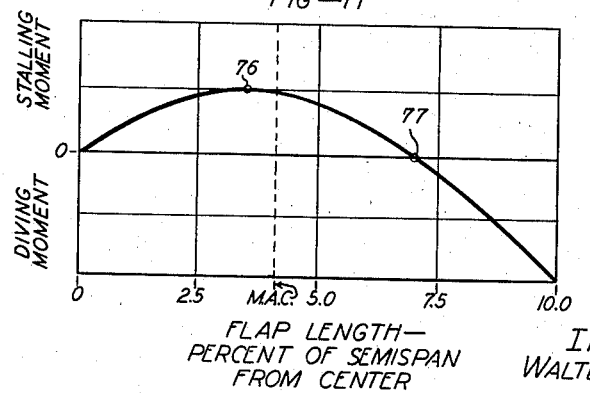
Figure 11 is a characteristic curve showing the relationship of flap span length to flap control moment.

Figure 11 illustrates diagrammatically and qualitatively what effect variation of the spanwise length of the flap has on the pitching moment it is capable of effecting. Accordingly, as the flap is increased in spanwise length, a given downward deflection of the flap produces progressively greater stalling moments until an optimum length is reached somewhere near the spanwise position of the mean aerodynamic chord as indicated at 76 on the curve. Further lengthening of the flap results in diminishing pitching moment for the same deflection until a length of approximately 75% of the span is reached as indicated at 77 on the curve where the flap is ineffective to alter the longitudinal pitching moment. At this point the flaps of such spanwise length may be lowered to increase the maximum effective coefficient of lift of the airfoil without producing either diving or stalling moment in the airplane. Such an arrangement would be desirable in some cases where flaps are desired to be employed as high lift devices or brakes without imposing the large added diving moments usually associated with their use. For example, it is desirable in some cases in either the conventional airplane or in the so-called forward tail airplane to avoid the high balancing loading imposed upon the horizontal stabilizer when the flaps are lowered or extended with the attendant rearward movement of the center of pressure, by employing sufficient sweep-back and root section flaps of such length as to minimize or eliminate the pitching moment effected thereby, in the manner of this invention.

With further reference to Figure 11, further extension of the spanwise length of the flap past point 77 up to full span flaps, results in pitching moments which are opposite in sense to that produced by the beforementioned shorter flaps on the sweep-back wing.

If desired, three separate flaps may be employed as illustrated at 18, 19 and 21 in Figure 6 and the combined length of flaps 18 and 21 may be made such as to extend to the length corresponding to point 76 as indicated in Figure 11, whereby their simultaneous use can be employed to effect an overall increased maximum coefficient of lift without appreciably changing the trim angle of the airplane. Flap 18 may be employed separately for imposing the desired changes in pitching moment for maneuvers, and flaps 19 adjacent the wing tips may be operated differentially in the conventional manner of ailerons for affecting lateral control.

Either plain or split flaps as shown in Figures 4 and 5 may be employed. The split type of flaps are particularly suitable where the primary object is to obtain maximum coefficients of lift of the main wing with a minimum shift of the center of pressure. The plain flap as shown in Figure 4 is preferable particularly for the innermost flap such as flap 18 where it serves as an elevator to provide longitudinal control for the airplane. In such cases it is desirable to provide for raising the flap above the neutral position for which the split flap is not suited, to increase the diving moment.

While the invention has been herein described as particularly applicable to the so-called tailless type of airplane, it is also applicable to either of the conventional rearward tail or forward tail types. In these other types of airplanes the invention may be advantageously employed to reduce the stabilizing or balancing forces which must otherwise be carried by the horizontal stabilizer surfaces when flaps are lowered.

In Figures 8A and 8B for purposes of analysis, the wing has been assumed to extend laterally from the longitudinal plane of symmetry without interference by the fuselage. This condition is possible in a low-wing monoplane where the split flaps may extend beneath the fuselage or in a parasol type of high wing monoplane where the wing and plain hinged flaps are in the clear above the fuselage. However, in a mid-wing type of airplane as illustrated in Figures 1 to 3, the root portion of the wing semispan will be contained within the fuselage necessitating a slight shortening of the flaps 18. This will cause only a slight change in the control characteristics without departure from the principle of this invention.

The flaps illustrated and employed in the computations of the present invention have a width of 0.20 of the wing chord but flap widths varying from 0.10 to 0.30 or greater have also been found suitable.

The foregoing is illustrative of a preferred method and embodiment of the invention and is not to be considered limiting since many modifications and adaptations may possibly be made by those skilled in the art within the scope of the claims.

I claim:

1. A tailless aircraft, comprising: a swept-back tapered wing including wing semispans with washout of incidence and straight leading and trailing edges from root to tip of each wing semispan, the ratio of the amount of taper to the degree of washout being such that the locus of approximate points of resultant centers of pressure on each wing semispan at operating angles of attack is an arcuate line extending generally spanwise of the wing, and the degree of sweepback of the wing semispans being of an amount to locate the center of pressure points corresponding to the angle of trim of each wing semispan on a rectilinear line passing through the center of gravity of said aircraft so that the points on the arcuate line for increasing angles of attack lie rearwardly of said rectilinear line and outwardly toward the tip of each wing semispan and the points on the arcuate line for decreasing angles of attack lie forwardly of said rectilinear line and inwardly toward the root of each wing semispan; trailing edge flap means hinged to each wing semispan inwardly of the tip portion thereof; and means for effecting angular displacement of said flap means, the major portion of said flap means being located to the rear of said rectilinear line, whereby downwardly displaced positions of said flap means cause forward displacement of the locus of said resultant centers of pressure, thereby varying simultaneously and inversely with respect to one another the maximum effective lift and center of pressure coefficients of said wing relative to the center of gravity of said aircraft.

2. A tailless aircraft as defined in claim 1, in which the flap means consists of a flap extending spanwise of the wing adjacent the root of each wing semispan; and in which the aircraft further includes an aileron adjacent the tip portion of each wing semispan, and means for effecting angular displacement of said ailerons.

3. A tailless aircraft as defined in claim 1, in which the flap means comprises a pair of adjacent flaps on each wing semispan with one flap of each pair constituting an inner flap and extending spanwise from a point adjacent the root of its associated wing semispan and with the other flap of each pair being disposed outwardly of its associated inner flap.

4. A tailless aircraft as defined in claim 1, in which the flap means comprises a pair of adjacent flaps on each wing semispan with one flap of each pair constituting an inner flap and extending spanwise from a point adjacent the root of its associated wing semispan and with the other flap of each pair constituting an intermediate flap and being disposed outwardly of its associated inner flap; and in which the aircraft further includes an aileron disposed outwardly of said intermediate flaps and adjacent the tip portion of each wing semispan, and means for effecting angular displacement of said ailerons.

WALTER H. KORFF.

REFERENCES CITED

The following references are of record in the file of this patent:

UNITED STATES PATENTS

| Number | Name | Date |
| --- | --- | --- |
| D. 127,185 | Northrop | May 13, 1941 |
| 1,003,721 | Dunne | Sept. 19, 1911 |
| 1,600,671 | Hill | Sept. 21, 1926 |
| 1,780,813 | Burnelli | Nov. 4, 1930 |
| 1,987,050 | Burnelli | Jan. 8, 1935 |
| 2,130,958 | Kramer | Sept. 20, 1938 |
| 2,172,289 | Munk | Sept. 5, 1939 |

(Other references on following page)

UNITED STATES PATENTS

| Number | Name | Date |
|---|---|---|
| 2,191,842 | Back | Feb. 27, 1940 |
| 2,210,642 | Thompson | Aug. 6, 1940 |
| 2,406,506 | Northrop | Aug. 27, 1946 |
| 2,412,647 | Northrop | Dec. 17, 1946 |

FOREIGN PATENTS

| Number | Country | Date |
|---|---|---|
| 202,957 | Great Britain | May 1, 1923 |
| 203,654 | Great Britain | May 2, 1923 |
| 558,959 | Germany | Apr. 18, 1933 |
| 573,166 | Germany | Mar. 28, 1933 |
| 824,833 | France | Nov. 18, 1937 |

OTHER REFERENCES

Jane's All the World Aircraft for 1932—pages 194c and 197c.